United States Patent
Scherer et al.

(10) Patent No.: US 9,341,478 B1
(45) Date of Patent: May 17, 2016

(54) SURFACE INFORMATION DISPLAY INHIBITING SYSTEM, DEVICE, AND METHOD

(71) Applicant: Rockwell Collins, Inc., Cedar Rapids, IA (US)

(72) Inventors: Christopher A. Scherer, Cedar Rapids, IA (US); Victor E. Villagomez, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 131 days.

(21) Appl. No.: 13/776,790

(22) Filed: Feb. 26, 2013

(51) Int. Cl.
*G01C 21/00* (2006.01)
*G06T 15/00* (2011.01)

(52) U.S. Cl.
CPC ............... *G01C 21/00* (2013.01); *G06T 15/00* (2013.01)

(58) Field of Classification Search
CPC . G01C 21/3638; G06T 17/05; G06T 2210/36
USPC ........................................................ 345/428
See application file for complete search history.

(56) References Cited

U.S. PATENT DOCUMENTS

| | | | | |
|---|---|---|---|---|
| 5,793,310 | A * | 8/1998 | Watanabe | G01C 21/3635 340/990 |
| 2003/0195672 | A1* | 10/2003 | He | G01C 23/00 701/3 |
| 2010/0231588 | A1* | 9/2010 | Barczak | 345/422 |
| 2013/0321401 | A1* | 12/2013 | Piemonte et al. | 345/419 |
| 2013/0328871 | A1* | 12/2013 | Piemonte et al. | 345/420 |

OTHER PUBLICATIONS

Kevin Boulanger, "Rendering Grass in Real Time with Dynamic Lighting", Aug. 12, 2008, pp. 1-8. http://www.kevinboulanger.net/grass.html.*

* cited by examiner

*Primary Examiner* — Xiao Wu
*Assistant Examiner* — Chong Wu
(74) *Attorney, Agent, or Firm* — Daniel M. Barbieri; Donna P. Suchy; Angel N. Gerdzhikov

(57) ABSTRACT

Present novel and non-trivial system, device, and method for inhibiting surface information to a operator are disclosed. An image generator receives navigation data; retrieves surface data; generates and modifies an image data set as a function of the navigation data and the surface data; and provides the modified image data set to a display system. The image data set could be representative of a three-dimensional, egocentric perspective of a scene outside the vehicle comprised of a current surface and corresponding markings, and at least one intersecting surface and corresponding markings; the intersecting surface may be a surface intersecting the current surface. The image data set may be modified by inhibiting the visibility of the intersecting surface markings for each intersecting surface falling within the image modification area. An intersecting surface may fall within the image modification area if the intersecting surface overlaps a boundary of the image modification area.

20 Claims, 5 Drawing Sheets

SURFACE INFORMATION DISPLAY INHIBITING SYSTEM, DEVICE, AND METHOD

BACKGROUND OF THE INVENTION

1. Field of the Invention

This invention pertains generally to the field of display units that provide information to the operator of a vehicle such as the pilot or flight crew of an aircraft.

2. Description of the Related Art

The generation of a three-dimensional image of terrain in a synthetic vision system may be accomplished using OpenGL, a standard specification defining a software interface to graphics hardware. A series of processing steps known generally as an "OpenGL Pipeline" are employed to render three-dimensional image data for presentation on the two-dimensional screen of a display unit. One of the processing steps known generally as "OpenGL Transformation" receives vertex data such as three-dimensional terrain data and transforms such data into two-dimensional screen coordinates (or window coordinates) data.

OpenGL Transformation is a series of processing steps known to those skilled in the art, and only a brief summary of these steps is provided. Coordinates of an object may be derived from vertex data, where objet coordinates are measured in reference to object space. When the object coordinates are multiplied by a matrix known generally as GL_MODELVIEW, eye coordinates of the object are yielded, where eye coordinates are measured in reference to eye space. When the eye coordinates are multiplied by a matrix known generally as GL_PROJECTION which integrates clipping and normalized device coordinates ("NDC") transformations, the eye coordinates of the object will become mapped to NDC. Then, by means of a viewport transformation, the coordinates of the NDC are scaled and translated in order to fit into the screen.

The GL_PROJECTION matrix includes a defined frustum for the purpose of performing the clipping transformation. In a perspective projection, a pyramid frustum originating from the origin of the eye coordinate system is generally employed, where the pyramid frustum has been truncated by a near plane (or projection plane). Objects and partial objects falling inside the truncated frustum will be projected onto the near plane, and those falling outside of the frustum will be clipped out.

Objects and partial objects may be comprised of, in part, objects stored in an aerodrome mapping database ("AMDB") as described in industry standards published by Aeronautical Radio, Inc. ("ARINC") and/or Radio Technical Commission for Aeronautics ("RTCA") such as, but not limited to, ARINC Specification 816 entitled "Embedded Interchange Format for Airport Mapping Database" and RTCA DO-272A entitled "User Requirements for Aerodrome Mapping Information." DO-272A provides for aerodrome surface mapping requirements for aeronautical uses particularly on-board aircraft.

Objects stored in the AMDB include, in part, data representative of airport surfaces and surface markings corresponding to surface such as, but not limited to, runways, taxiways, and aprons. When projected onto the near plane, the widths of surfaces that are perpendicular or nearly perpendicular to the surface on which the aircraft is located may appear wide or narrow, depending on their relative location to the aircraft. Surfaces relatively close to the aircraft may appear wide and surface relatively far from the aircraft may line appear narrow. When referenced to the horizon line, surfaces appearing closer to the horizon line may appear thinner than those surfaces that are not. When surface markings are superimposed against their corresponding surfaces, the relatively thin widths of surfaces superimposed by its corresponding markings may make it difficult for the pilot to discern or distinguish between a surface and surface markings for those surfaces appearing near the horizon line. This could result with pilot confusion, a loss of situational awareness, and add to the visual clutter of the display when symbology is added and superimposed against the surfaces and surface markings.

BRIEF SUMMARY OF THE INVENTION

The embodiments disclosed herein present novel and non-trivial system, device, and method for inhibiting the display of surface information on an aircraft display unit. With the embodiments disclosed herein, pilot confusion and visual clutter may be reduced, and situational awareness may be improved.

In one embodiment, a system is disclosed for inhibiting the display of surface information to a pilot of an aircraft. The system may be comprised of a source of navigation data, a source of surface data, an image generator for generating and modifying an image data set, and a display system.

In another embodiment, a device is disclosed for inhibiting the display of surface information to a pilot of an aircraft, where such device could be the image generator configured to generate and modify the image data set based upon the navigation data and the surface data. The image data set could be representative of an image of a three-dimensional, egocentric perspective of a scene outside the aircraft comprised of a current surface and current surface markings located in the scene, and one or more intersecting surfaces and surface markings of each intersecting surface located in the scene. In an additional embodiment, the image could include one or more non-intersecting surfaces and surface markings of each non-intersecting surface.

In another embodiment, a method is disclosed for inhibiting the display of surface information to a pilot of an aircraft, where such method could be performed by the image generator. When properly configured, the image generator may receive navigation data representative of at least the location of the aircraft; retrieve surface data based upon the navigation data; generate and modify the image the image data set; and provide such image data set to the display system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
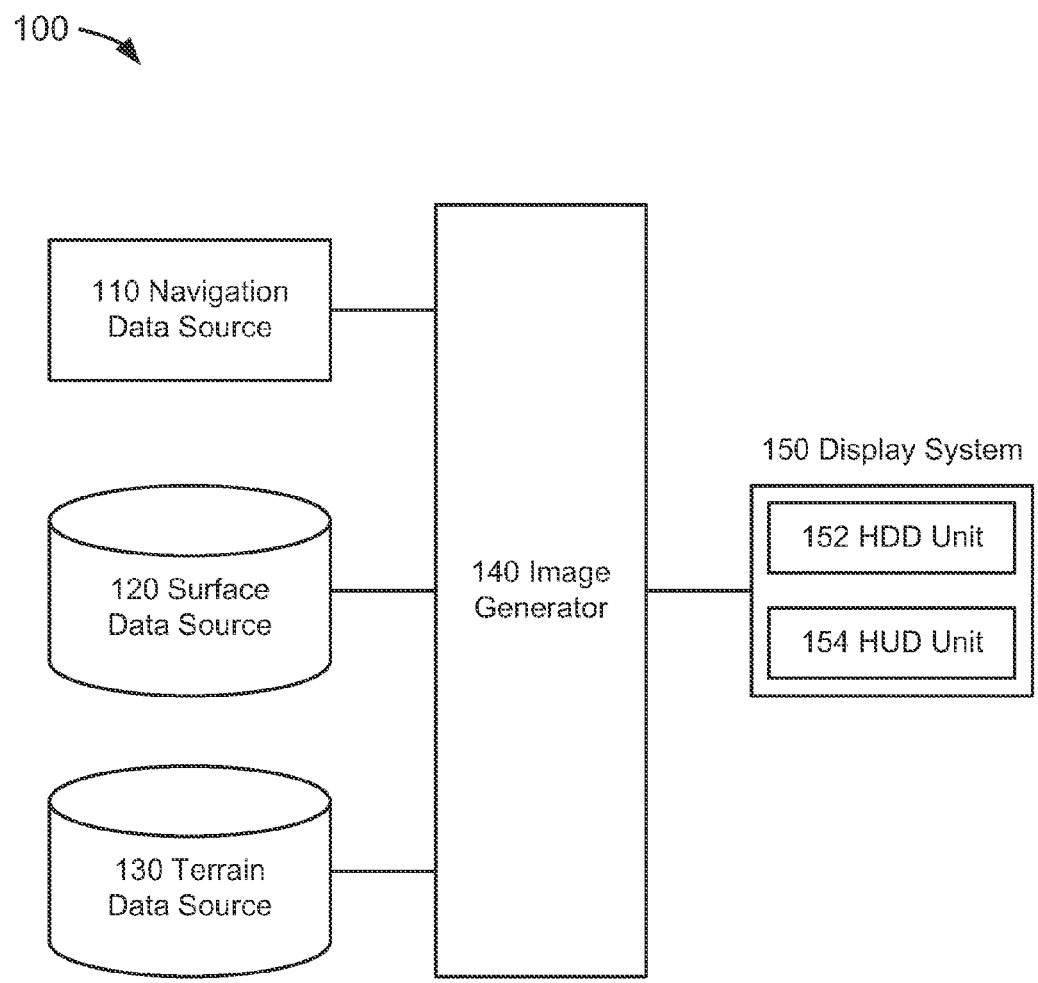
FIG. 1 depicts a block diagram of a system for inhibiting the display of surface information on an aircraft display unit.

FIG. 1 depicts a block diagram of an information inhibiting system 100 suitable for implementation of the techniques described herein. The information inhibiting system 100 of an embodiment of FIG. 1 includes a navigation data source 110, a surface data source 120, a terrain data source 130, an image generator ("IG") 140, and a display system 150.

In an embodiment of FIG. 1, the navigation data source 110 could be comprised of a system or systems that provide navigation data information in an aircraft. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles. Although the following discussion will be drawn to aircraft and pilots, the embodiments herein may be applied to any vehicle and vehicle operator.

The navigation data source 110 may include any system for providing navigation data including, but not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, and heading. As embodied herein, aircraft position includes geographic position (e.g., latitude and longitude coordinates), altitude, or both. As embodied herein, aircraft orientation may include pitch, roll, and/or yaw information related to the attitude of the aircraft. The navigation data source 110 could provide the navigation data to the IG 140 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining the current location of the aircraft.

In an embodiment of FIG. 1, the surface data source 120 could be comprised of any source of surface and surface markings data. The surface data source 120 could be comprised of a taxi navigation database for storing airport data representative of any surface or road located on or off the airport such as, but not limited to, airport surfaces and surface markings. In addition, the surface data source 120 could be a database that could store location data representative of a plurality of surface locations that define at least one feature such as, but not limited to, surface edges and/or boundaries, and/or surface markings such as, but not limited to, runway markings, taxiway markings, and non-runway markings.

Returning to FIG. 1, the taxi navigation database could comprise an aerodrome mapping database ("AMDB") as described in industry standards published by Aeronautical Radio, Inc. ("ARINC") and/or Radio Technical Commission for Aeronautics ("RTCA") such as, but not limited to, ARINC Specification 816 entitled "Embedded Interchange Format for Airport Mapping Database" and RTCA DO-272A entitled "User Requirements for Aerodrome Mapping Information." DO-272A provides for aerodrome surface mapping requirements for aeronautical uses particularly on-board aircraft. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB. As embodied herein, the surface data source 120 could provide reference point data to the IG 140 for subsequent processing as discussed herein.

The surface data source 120 could be comprised of a flight navigation database that may be part of the FMS. The flight navigation database may contain records which provide reference data such as, but not limited to, surface data for runways.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

In an embodiment of FIG. 1, the terrain data source 130 could be comprised one or more sources of terrain data that could be comprised of terrain data and/or surface feature data. The terrain data source 130 could be comprised of, but is not limited to, a terrain database configured to store terrain data contained in digital elevation models ("DEM"). Generally, the terrain data of a DEM are stored as grids, and each grid represents an area of terrain and is commonly referred to as a terrain cell. The terrain data source 130 could be a database configured to store data representative of surface features such as, but not limited to, obstacles, buildings, lakes and rivers, and paved or unpaved surfaces. It should be noted that there could be an overlap of data between the surface data source 120 and the terrain data source 130. As embodied herein, a manufacturer and/or end-user may use the data from either source when such overlap occurs.

In an embodiment of FIG. 1, the IG 140 may be any electronic data processing unit or combination of processing units which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. As embodied herein, the IG 140 could be a processor(s) used by or in conjunction with any other system of the aircraft including, but not limited to, the navigation data source 110, the surface data source 120, the terrain data source 130, the display system 150, or any combination thereof.

The IG 140 may be programmed or configured to receive as input data representative of information obtained from various systems and/or sources including, but not limited to, the navigation data source 110, the surface data source 120, the terrain data source 130. As embodied herein, the terms "programmed" and "configured" are synonymous. The IG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The IG 140 may be programmed or configured to execute one or both of the methods discussed in detail below. The IG 140 may be programmed or configured to provide output data to various systems and/or units including, but not limited to, the display system 150.

In the embodiment of FIG. 1, the display system 150 may receive image data from the IG 140. The display system 150 could include any unit that provides symbology of tactical flight information including, but not limited to, a Head-Down Display ("HDD") unit 152 and/or a Head-Up Display ("HUD") unit 154. As embodied herein, the disclosures may be applied to one or more portable devices including, but not limited to, laptop computer, smartphone, and/or tablets which employ a display unit.

The HDD unit 152 may present tactical information to the pilot or flight crew—information relevant to the instant or immediate control of the aircraft, whether the aircraft is in flight or on the ground. The HDD unit 152 is typically a unit mounted to an aircraft's flight instrument panel located in front of a pilot and below the windshield and the pilot's field of vision. The HDD unit 152 displays the same information found on a primary flight display ("PFD"), such as "basic T" information (i.e., airspeed, attitude, altitude, and heading). Although it provides the same information as that of a PFD, the HDD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HDD unit 152 is designed to provide flexible configurations which may be tailored to the desired configuration specified by a buyer or user of the aircraft. In an embodiment of FIG. 1, locations above surface features may be depicted in an image on the HDD unit 152 using location highlighters as disclosed herein.

The HUD unit 154 provides tactical information to the pilot or flight crew in the pilot's forward field of view through the windshield, eliminating transitions between head-down to head-up flying. Similar to the HDD unit 152, the HUD unit 154 may be tailored to the desired configuration specified by a buyer or user of the aircraft. As embodied herein, the HDD unit 152, the HUD unit 154, or any display unit could receive an image data set from IG 140 for subsequent presentation.

The advantages and benefits of the embodiments discussed herein may be illustrated by showing the locations within an image where the display of surface markings may be inhibited. Although the following discussion will be drawn to surfaces and markings comprised of taxiways and taxiway markings, respectively, the embodiments herein are not limited to these but include any other airport surface and surface markings such as, but not limited to, runway and runway markings.

Figure 2A:
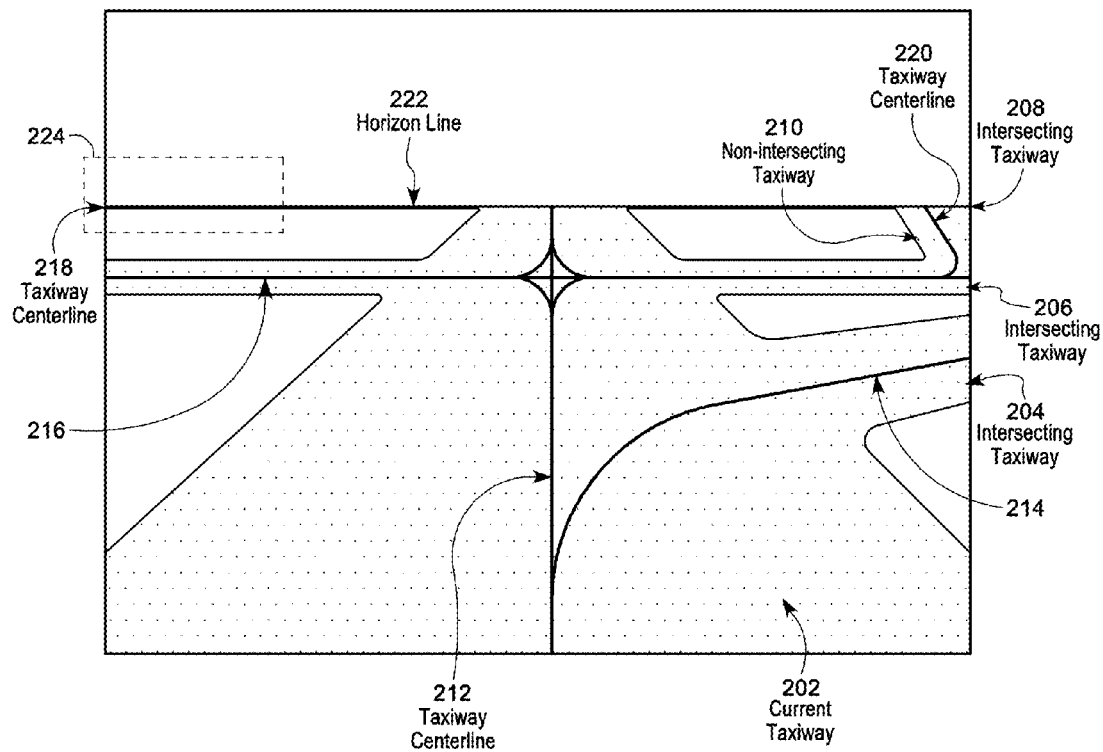
FIG. 2A depicts an egocentric display of surfaces.

Referring to FIG. 2A, taxiways are depicted on the HDD unit 152 having an assumed size of 1400 pixels by 1050 pixels: a current taxiway 202, an intersecting taxiway 204, an intersecting taxiway 206 crossing the current taxiway 202, an intersecting taxiway 208 crossing the current taxiway 202, and a non-intersecting taxiway 210 that does not intersect the current taxiway 202. The taxiways 202, 204, 206, 208, and 210 are marked with taxiway centerlines 212, 214, 216, 218, and 220, respectively. For the purpose of illustration and not of limitation, the depiction of FIG. 3 will be used in the discussion that follows.

In a scene located outside the aircraft, it becomes difficult for a pilot to see an intersecting surface if that surface is further away from another surface that is closer to the aircraft. When the scene is presented in an image, it may be difficult for a pilot to discern an intersecting surface that is further away than another intersecting surface. Referring to FIG. 2A, assume that intersecting taxiways 204, 206, and 208 have the same width. When presented in an image, intersecting taxiway 204 is closest to the aircraft and is shown as being wider than intersecting taxiway 206; likewise, intersecting taxiway 206 is closer to the aircraft and is shown as being wider than intersecting taxiway 208. Surfaces that are near the horizon line 218 are difficult to discern. In fact, a yellow line indicative of a taxiway centerline may be readily seen by a pilot and indicate the existence of a taxiway being superimposed by the taxiway centerline. This is seen in FIG. 2A where taxiway centerline 218 is superimposed over intersecting taxiway 208, making it difficult to see the image of the intersecting taxiway 208 or its edges.

Figure 2B:
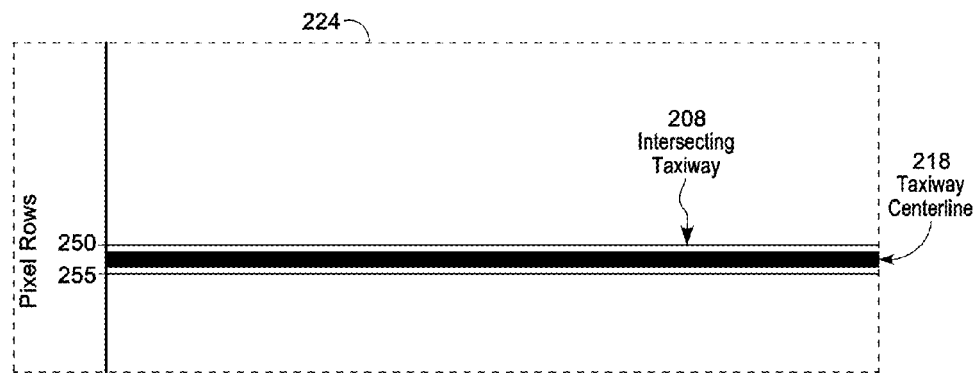
FIG. 2B depicts an exploded view of a surface and a surface marking appearing in FIG. 2A.

The area 224 of FIG. 2A is shown as an exploded view in FIG. 2B. As shown in FIG. 2B, intersecting taxiway 208 is 6 pixels wide; the far edge of intersecting taxiway 208 is located at pixel row 250 and the near edge is located at pixel row 255. Taxiway centerline 218 is 4 pixels wide and located in pixel rows 251-254 within taxiway centerline 218. When viewed by the pilot, this could look like a yellow line only. Moreover, intersecting taxiway 208 and taxiway centerline 218 could create a source of visual clutter when symbology (e.g., tick marks of a pitch attitude indicator) is superimposed against intersecting taxiway 208 and taxiway centerline 218, which could make the symbology difficult to visually discern and reduce the pilot's situational awareness.

Figure 3A:
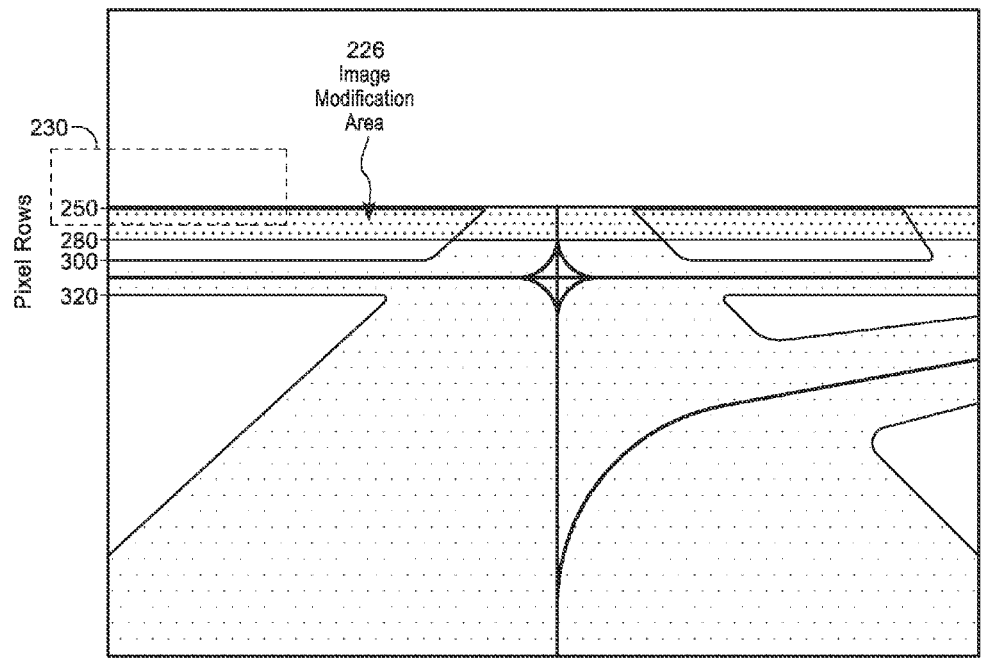
FIG. 3A depicts an image modification area.
Figure 3B:
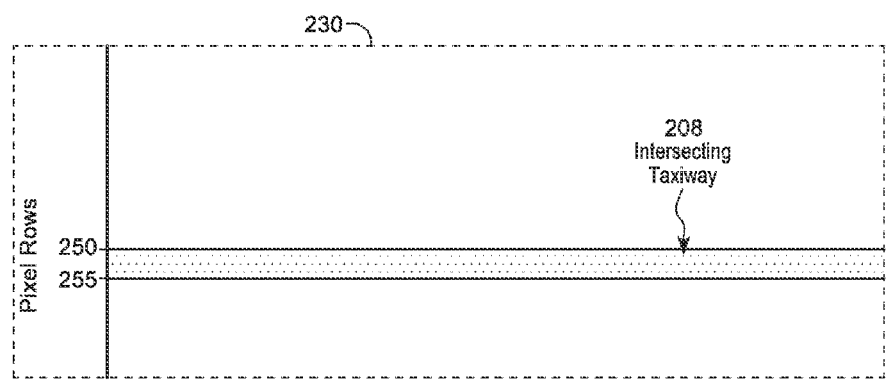
FIG. 3B depicts the exploded view of FIG. 2B in which the display of the surface marking has been inhibited.

The advantages and benefits of the embodiments discussed herein may be illustrated by showing how an image modification area may be employed to inhibit the display of surface marking(s). Referring to FIG. 3A, an image modification area 226 is shown. As observed, the size of the image modification area 226 is 31 pixels deep (pixel row 250 to pixel row 280). Because intersecting taxiway 208 falls within the image modification area 226, the display of its corresponding marking(s) (here, taxiway centerline 218) could be inhibited as shown in the exploded view of area 230 in FIG. 3B.

Although the image modification area 226 may be employed for intersecting surfaces, it may not be necessary for surface(s) that do not intersect the current surface. Returning to FIG. 3A, the display of taxiway centerline 220 has been inhibited even though its corresponding non-intersecting taxiway 210 overlaps the lower boundary of the image modification area 226. The inhibition of surface marking(s) of non-intersecting surface(s) may enhance situational awareness by reducing visual clutter.

Figure 4A:
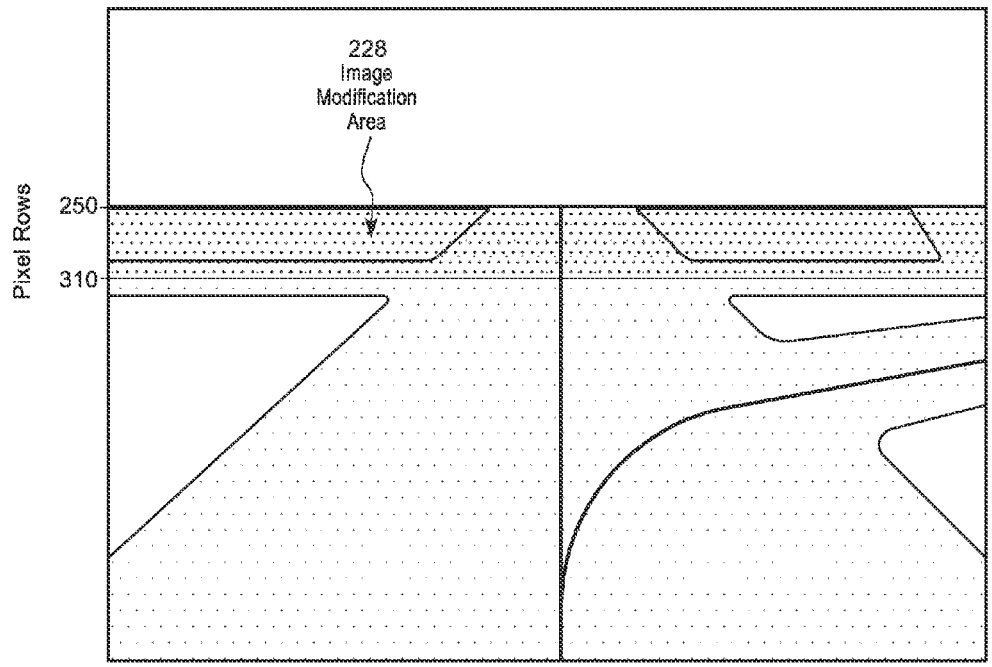
FIG. 4A depicts a surface overlapping a boundary of the image modification area for which the display of surface markings has been inhibited.
Figure 4B:
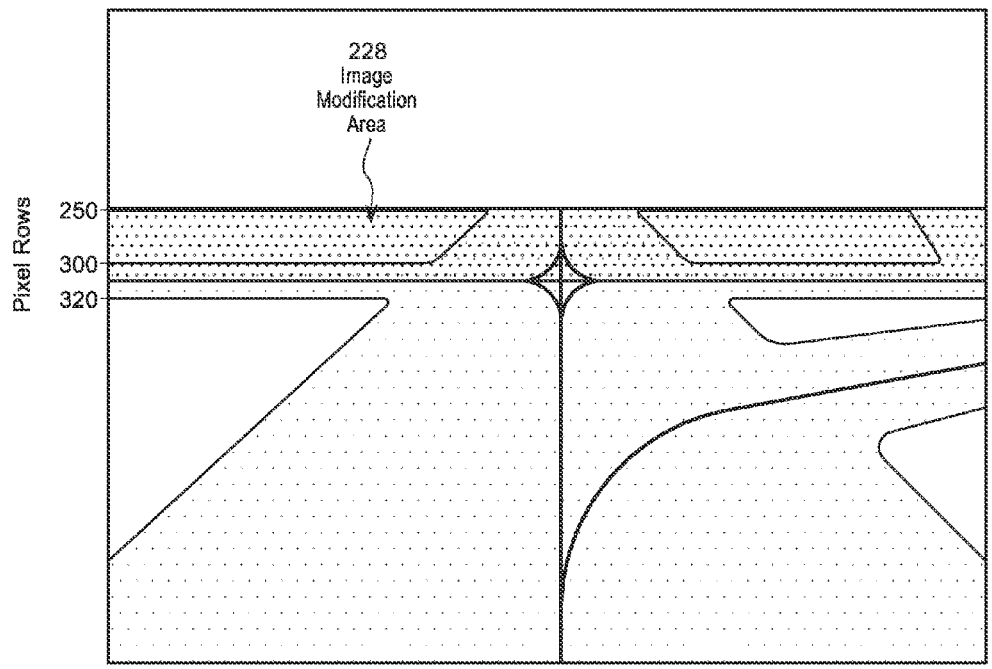
FIG. 4B depicts the display of surface markings of a surface overlapping a boundary of the image modification area.

The display of surface markings may be inhibited even if only a portion of the surface falls within an image modification area. Referring to FIGS. 4A and 4B, an image modification area 228 is shown. As observed, the size of the image modification area 228 is 61 pixels deep (pixel row 250 to pixel row 310), and intersecting taxiway 206 falls within the image modification area 228 partially; that is, intersecting taxiway 206 overlaps the lower boundary of the image modification area 228. In this instance, a manufacturer and/or end-user may configure the IG 140 to inhibit the display of taxiway centerline 216 as shown in FIG. 4A or display it as shown in FIG. 4B.

In an alternative embodiment, the boundaries of an image modification area may be defined by a reference other than pixel rows. Instead, the boundaries of an image modification area may correspond to one of the planes defined in the OpenGL specification. For example, the location of the lower boundary could correspond to a defined distance from the near plane or a defined distance from the far plane of a truncated frustum employed in an OpenGL specification.

Figure 5:
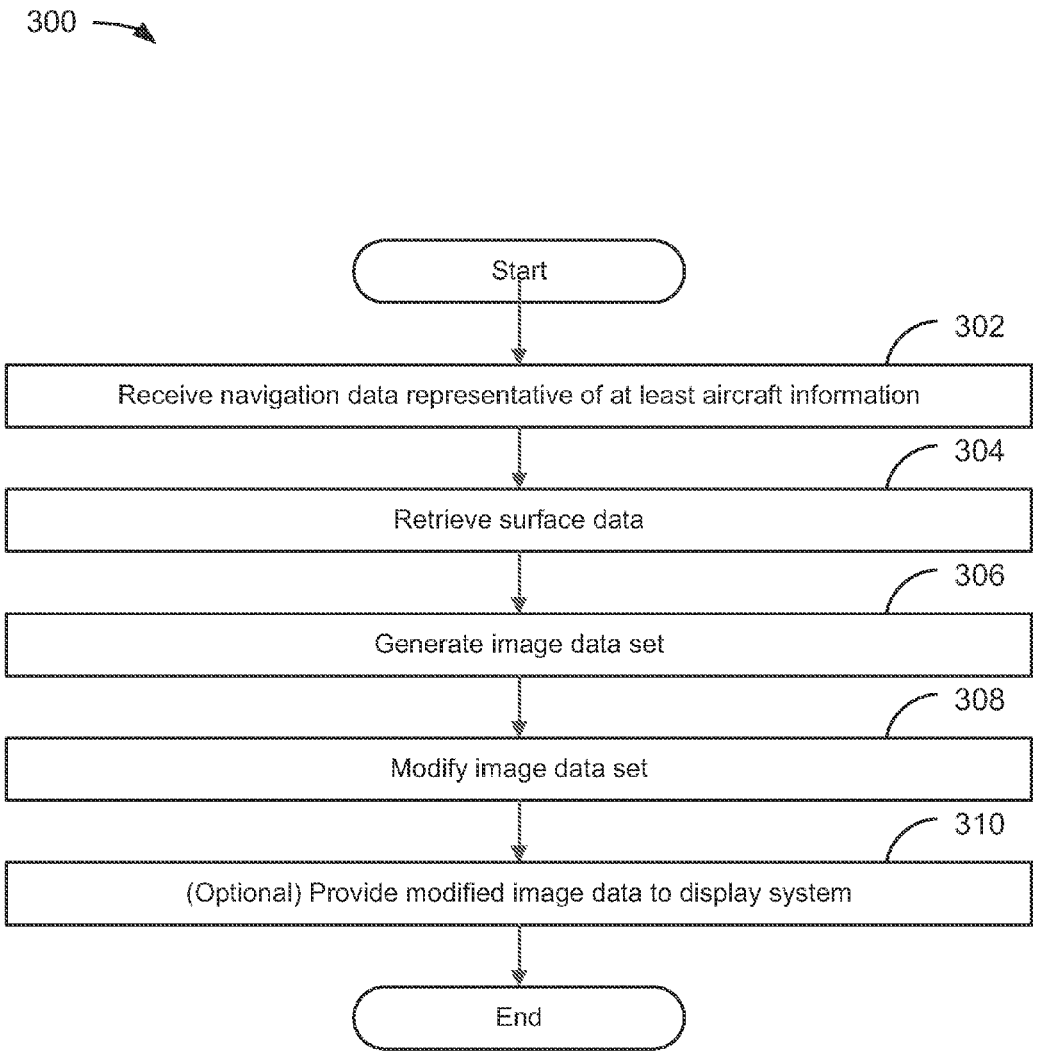
FIG. 5 provides a flowchart illustrating a method for inhibiting the display of surface information.

FIG. 5 depicts flowchart 300 disclosing an example of a method for inhibiting surface information to a viewer such as, but not limited to, a pilot of an aircraft, where the IG 140 may be programmed or configured with instructions corresponding to the following modules embodied in flowchart 300. As embodied herein, the IG 140 may be a processor or a combination of processors found in the navigation data source 110 and/or the display system 150. Also, the IG 140 may be a processor of a module such as, but not limited to, a printed circuit card having one or more input interfaces to facilitate the two-way data communications of the IG 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

The flowchart 300 begins with module 302 with the receiving of vehicle navigation data representative of at least location information such as vehicle location. In one embodiment, the navigation data could be representative of heading information if such information is not derived from location information.

The flowchart continues with module 304 with the retrieving of surface data. Here, the retrieval of the surface data could correspond to the scene outside the vehicle, where such scene may be determined from the navigation data. In addition, the surface data could be representative of a plurality of surfaces and surface markings located in the scene. As embodied herein, the surface could be any surface located on or off the airport. One surface could be comprised of a current surface, that is, the surface on which the vehicle is currently situated. Another surface could be comprised of an intersecting surface, that is, a surface which intersects the current surface. In an additional embodiment, another surface could be comprised of a non-intersecting surface, that is, a surface which does not intersect the current surface.

The flowchart continues to module 306 with the generation of an image data set as a function of the navigation data and the surface data. Here, the image data set could be representative of an image within which one or more one or more surfaces having one or more surface markings in the outside scene outside viewable by an operator and that appears within an egocentric, perspective scene outside the vehicle. In one embodiment, one surface could be comprised of the current surface having one or more current surface markings correspond to it. In an additional embodiment, one or more surfaces could be comprised of intersecting surfaces, where each intersecting surface could have one or more intersecting surface markings corresponding to it. In an additional embodiment, one or more surfaces could be comprised of non-intersecting surfaces, where each non-intersecting surface could have one or more non-intersecting surface markings corresponding to it. In an embodiment in which terrain data is retrieved from the terrain source 130, the function for generating the image data set could include the terrain data; as such, the egocentric, perspective scene outside the vehicle includes the terrain represented in the terrain data.

The flowchart continues to module 308 with the modifying of the image data set as a function of an image modification area, where the image modification area could be defined using a number of pixel rows beneath the horizon line presented in the egocentric, perspective scene. The image data set may be modified by determining one or more intersecting surfaces falling within the image modification area and inhibiting the visible display of the one or more surface markings of each intersecting surface falling the image modification area. In an additional embodiment, the image data set may be modified by inhibiting the visible display of the surface markings of the current surface falling within the image modification area. The modified image data set could be representative of an image in which the display of surface marking(s) appearing within the image scene has been inhibited. In one embodiment, the inhibiting of visibility of the surface marking(s) could be accomplished by setting a transparency setting of each surface marking to 100 percent. In another embodiment, the inhibiting of visibility of the surface marking(s) could be accomplished by matching the color of the surface. In an embodiment in which terrain data is retrieved from the terrain source 130, the function for modifying the image data set could include the terrain data; as such, the egocentric, perspective scene outside the vehicle includes the terrain represented in the terrain data.

The flowchart continues to optional module 310 with the providing of the modified image data set to a display system, wherein the image represented in the modified image data set may be presented on one or more display units. As a result, current surface markings and intersecting surface markings for each intersecting surface falling outside the image modification area (i.e., not falling within the image modification area) may be presented to the pilot and not inhibited from his or her view. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for inhibiting the display of information to a viewer, such system comprising:
   a source of navigation data;
   at least one source of surface data; and
   an image generator configured to
     receive navigation data representative of at least a location of a vehicle on a current paved surface;

retrieve surface data based upon the navigation data, where
the surface data is representative of at least
a first paved surface and first paved surface markings, and
at least one second paved surface and second paved surface markings for each second paved surface, where
the first paved surface is comprised of the current paved surface, and
each second paved surface is comprised of a paved surface intersecting the first paved surface;
generate an image data set as a function of the navigation data and the surface data, where
the image data set is representative of an image of a three-dimensional perspective of an outside scene comprised of
the first paved surface and first paved surface markings located in the outside scene, and
each second paved surface and second paved surface markings of each second paved surface located in the outside scene; and
modify the image data set as a function of an image modification area, where
the image modification area is a portion of the image, and
the image data set is modified by inhibiting the visibility of the second paved surface markings for each second paved surface falling within the image modification area without inhibiting the visibility of the first paved surface, each second paved surface, and at least a part of the first paved surface markings of the first paved surface.

2. The system of claim 1, wherein the image data set is further modified by inhibiting the visibility of the first paved surface markings of the first paved surface falling within the image modification area.

3. The system of claim 1, wherein
the surface data is further representative of
at least one third paved surface and third paved surface markings for each third paved surface, where
each third paved surface is comprised of a paved surface not intersecting the first paved surface;
the image is further comprised of
each third paved surface and third paved surface markings of each third paved surface located in the outside scene; and
the image data set is further modified by inhibiting the visibility of the third paved surface markings for each third paved surface.

4. The system of claim 1, wherein
the image modification area is comprised of a lower boundary, where
the location of the lower boundary is determined by a number of pixel rows below a horizon line corresponding to the horizon.

5. The system of claim 1, wherein
the image modification area is comprised of a lower boundary, where
the location of the lower boundary corresponds to a distance from either the near plane or far plane of a truncated frustum employed in an OpenGL specification.

6. The system of claim 1, further comprising:
a source of terrain data, such that
the image generator is further configured to
retrieve terrain data based upon the navigation data, such that
the function for generating the image data set or the function of the modifying of the image data set includes the terrain data, whereby
the image is further comprised of terrain located in the outside scene.

7. The system of claim 1, further comprising:
a display system, such that
the image generator is further configured to
provide the modified image data set to the display system, and
the display system is configured to
receive the modified image data set, and
present the image represented in the modified image data set on at least one display unit, whereby
first paved surface markings and second paved surface markings for each second paved surface falling outside the image modification area are presented to the viewer.

8. The system of claim 1, wherein the image generator is a processing unit of a display system.

9. A device for inhibiting the display of information to a viewer, such device comprising:
an image generator configured to
receive navigation data representative of at least a location of a vehicle on a current paved surface;
retrieve surface data based upon the navigation data, where the surface data is representative of at least
a first paved surface and first paved surface markings, and
at least one second paved surface and second paved surface markings for each second paved surface, where
the first paved surface is comprised of the current paved surface, and
each second paved surface is comprised of a paved surface intersecting the first paved surface;
generate an image data set as a function of the navigation data and the surface data, where
the image data set is representative of an image of a three-dimensional perspective of an outside scene comprised of
the first paved surface and first paved surface markings located in the outside scene, and
each second paved surface and second paved surface markings of each second paved surface located in the scene; and
modify the image data set as a function of an image modification area, where
the image modification area is a portion of the image, and
the image data set is modified by inhibiting the visibility of the second paved surface markings for each second paved surface falling within the image modification area without inhibiting the visibility of the first paved surface, each second paved surface, and at least a part of the first paved surface markings of the first paved surface.

10. The device of claim 9, wherein the image data set is further modified by inhibiting the visibility of the first paved surface markings of the first paved surface falling within the image modification area.

11. The device of claim 9, wherein
the image modification area is comprised of a lower boundary, where the location of the lower boundary is determined by a number of pixel rows below a horizon line corresponding to the horizon.

12. The device of claim 9, wherein
the image modification area is comprised of a lower boundary, where
the location of the lower boundary corresponds to a distance from either the near plane or far plane of a truncated frustum employed in an OpenGL specification.

13. The device of claim 9, wherein
the image generator is further configured to
retrieve terrain data based upon the navigation data, such that
the function for generating the image data set or the function of the modifying of the image data set includes the terrain data, whereby
the image is further comprised of terrain located in the outside scene.

14. The device of claim 9, wherein
the image generator is further configured to
provide the modified image data set to the display system configured to receive the modified image data set, such that
the image represented in the modified image data set is presented on at least one display unit, whereby
first paved surface markings and second paved surface markings for each second paved surface falling outside the image modification area are presented to the viewer.

15. A method for inhibiting the display of information to a viewer, such method comprising:
receive navigation data representative of at least a location of a vehicle on a current paved surface;
retrieving surface data based upon the navigation data, where the surface data is representative of at least
a first paved surface and first paved surface markings, and
at least one second paved surface and second paved surface markings for each second paved surface, where
the first paved surface is comprised of the current paved surface, and
each second paved surface is comprised of a paved surface intersecting the first paved surface;
generating an image data set as a function of the navigation data and the surface data, where
the image data set is representative of an image of three-dimensional perspective of an outside scene comprised of
the first paved surface and first paved surface markings located in the outside scene, and
each second paved surface and second paved surface markings of each second paved surface located in the outside scene; and
modifying the image data set as a function of an image modification area, where
the image modification area is a portion of the image, and
the image data set is modified by inhibiting the visibility of the second paved surface markings for each second paved surface falling within the image modification area without inhibiting the visibility of the first paved surface, each second paved surface, and at least a part of the first paved surface markings of the first paved surface.

16. The method of claim 15, wherein the image data set is further modified by inhibiting the visibility of the first paved surface markings of the first paved surface falling within the image modification area.

17. The method of claim 15, wherein
the image modification area is comprised of a lower boundary, where
the location of the lower boundary is determined by a number of pixel rows below a horizon line corresponding to the horizon.

18. The method of claim 15, wherein
the image modification area is comprised of a lower boundary, where
the location of the lower boundary corresponds to a distance from either the near plane or far plane of a truncated frustum employed in an OpenGL specification.

19. The method of claim 15, further comprising:
retrieving terrain data based upon the navigation data, such that
the function for generating the image data set or the function of the modifying of the image data set includes the terrain data, whereby
the image is further comprised of terrain located in the outside scene.

20. The method of claim 15, further comprising:
providing the modified image data set to the display system configured to receive the modified image data set, such that
the image represented in the modified image data set is presented on at least one display unit, whereby
first paved surface markings and second paved surface markings for each second paved surface falling outside the image modification area are presented to the viewer.

\* \* \* \* \*